(12) United States Patent
Degani et al.

(10) Patent No.: US 8,949,093 B2
(45) Date of Patent: Feb. 3, 2015

(54) METHOD AND SYSTEM FOR DESIGNING, ANALYSING AND SPECIFYING A HUMAN-MACHINE INTERFACE

(75) Inventors: Asaf Degani, Raanana (IL); Andrew W. Gellatly, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 13/432,979

(22) Filed: Mar. 28, 2012

(65) Prior Publication Data

US 2012/0253765 A1 Oct. 4, 2012

Related U.S. Application Data

(60) Provisional application No. 61/470,156, filed on Mar. 31, 2011.

(51) Int. Cl.
*G06F 3/048* (2013.01)
*G06F 9/44* (2006.01)
*G06F 17/50* (2006.01)

(52) U.S. Cl.
CPC ........................................ *G06F 8/38* (2013.01)
USPC ................. 703/7; 703/22; 715/764; 717/108; 717/122; 700/9

(58) Field of Classification Search
USPC ..................... 703/7, 22; 717/108, 122; 700/9; 715/764
See application file for complete search history.

(56) References Cited

U.S. PATENT DOCUMENTS

| | | | | |
|---|---|---|---|---|
| 6,201,996 | B1 * | 3/2001 | Crater et al. | 700/9 |
| 7,954,084 | B2 * | 5/2011 | Arcaro et al. | 717/108 |
| 7,974,793 | B2 * | 7/2011 | Weddle | 702/58 |
| 8,296,733 | B2 * | 10/2012 | Phillips et al. | 717/122 |
| 2012/0054650 | A1 * | 3/2012 | Bliss et al. | 715/764 |
| 2012/0096463 | A1 * | 4/2012 | Agarwal et al. | 718/100 |

* cited by examiner

*Primary Examiner* — Thai Phan
(74) *Attorney, Agent, or Firm* — Mark S. Cohen; Pearl Cohen Zedek Latzer Baratz LLP (57) ABSTRACT

A method for analyzing and specifying a Human-Machine Interface (HMI) may include providing an HMI designing system, constructing an HMI design that includes objects created from the HMI designing system and associating the objects using events and transitions. Objects may include states and screens of a graphical user interface. The method may receive input from a user and describe a human-machine interface using syntax that is based on the user input. The syntax may include graphical representations of states and transitions between the states. The HMI designing system may include a memory to store representations of the human-machine interface, a processor to receive input from a user and determine graphical representations of states and transitions between states, and a display to display the HMI.

17 Claims, 12 Drawing Sheets

| | | |
|---|---|---|
| 1] | control name | Faceplate control pressed; event is triggered on "press" |
| 2] | control name_SK | Softkey button pressed; event is triggered on "press" |
| 3] | control name_TS | Touch screen button pressed; event is triggered on "press" |
| 4] | control name{^} | Indicates event is triggered when control is "released" |
| 5] | control name{^<t} | Indicates event is triggered when control is pressed and "released" prior to time = t; time is specified in seconds |
| 6] | control name{^>t} | Indicates event is triggered after control has been pressed and "held" for longer than time = t; time is specified in seconds |
| 7] | control name{c} | Indicates rotary-type control is "rotated clockwise" |
| 8] | control name{cc} | Indicates rotary-type control is "rotated counter-clockwise" |
| 9] | .or. | Indicates that the transition is triggered by one of several events (e.g. when "back .or. home" are pressed) |
| 11] | .and. | Indicates that the transition is triggered when two or more events must be true (e.g. when "home .and. power" are pressed simultaneously) |
| 12] | ──event──▶ | Indicates a transition between states/screens |
| 13] | ──event──<condition 2, condition 1 | Indicates a conditional transition between states/screens (e.g. if larger than 1 go to state A, otherwise state B) |
| 14] | (C) | Indicates transition whose resultant state/screen is conditional; alternative method for indicating a conditional transition between states/sceens |
| 15] | (P) | Indicates transitioning to the previous screen that user had come from |
| 16] | (Pn) | Indicates transitioning to the previous screen starting at the top of its hierarchy (e.g., the start of an alphabetical list) |
| 17] | (same) | Indicates continuing to display the same screen shown prior to the event |
| 18] | (H) | Indicates transitioning to the last visited state and corresponding screen (i.e., History) |
| 19] | (⌂) | Indicates transitioning back to the Home screen |
| 20] | [H] | Data History |
| 21] | [U] | Data Update |
| 22] | ●──▶ | Continuity |

FIG. 1A

| | | |
|---|---|---|
| 23] | •—— | Discontinuity |
| 24] | ⇢ | Automatic transition (i.e. timed or internally triggered) |
| 25] | ⇢T(out):2⇢ | Time out transition; transition fires automatically after X seconds in the state |
| 26] | ▽ | Drafting Break |
| 27] | STATE note:## | Describes a State |
| 28] | \_VIEW | Describes an individual Screen/View |
| 29] | View Grp/Set | Describes a group of Screen/Views |
| 30] | STATE note:## / \_VIEW | Describes that the state/screen may be "unavailable" (e.g., due to vehicle optioning, internet availability) |
| 31] | Ⓢ | Indicates transitioning to the view that corresponds with the "selected" item |
| 32] | [G] | Graphical Element Update |
| 33] | [R] | Resets List to Start/Top of List |
| 34] | Ⓔ | Indicates maintaining the same state as determined by the automation algorithm |
| 35] | —event→ | Indicates the event is executed in the state/screen where the termination "bar" is located |
| 36] | Ⓗ | Indicates transitioning to the last visited state and corresponding screen, including propagation to lower levels within a super state |

METHOD AND SYSTEM FOR DESIGNING, ANALYSING AND SPECIFYING A HUMAN-MACHINE INTERFACE

BACKGROUND

Human-machine interfaces (HMI, also known as "user interfaces") exist in or are produced by many machines and are designed to allow humans to easily and conveniently operate and control the machine so as to utilize it to the full of its capacity and its features. An HMI typically facilitates input of information or commands by a human operator (also referred to as a "user"), allowing the user to manipulate the machine. An HMI typically also offers output, which may be used by the user to get an indication on the effects of the user manipulation of that machine. For example, a modern automobile may have a variety of HMIs, such as, the tachometer, which indicates the speed the vehicle is riding in response to the driver's pressing on the accelerator pedal (or brake pedal), the front panel of a media center, which includes keys and knobs for facilitating choosing between receiving radio broadcasts or playing a CD or a DVD, and displaying the currently playing station (of the radio broadcast) or track or playing time (of the CD or DVD).

Current methods for specifying HMIs may seem insufficient at times to capture the complexity and details of modern user interaction. Current methods for designing HMIs may not allow the designer to view interaction details, their effect on the overall system, and view the system as a whole. Current methods for reviewing HMIs may be insufficient to communicate and discuss the details of alternative designs.

Current methods for analysis and evaluation of HMIs may also be insufficient to capture and understand (in detail) user-interaction patterns, user-preferences, and user expectations. There are no current methods for characterizing and incorporating HMI design patterns into the design process.

SUMMARY

A method for analyzing and specifying a Human-Machine Interface (HMI) may include providing an HMI designing system, constructing an HMI design that includes objects created from the HMI designing system and associating the objects using events and transitions. Objects may include states and screens of a graphical user interface. The method may receive input from a user and describe a human-machine interface using syntax that is based on the user input. The syntax may include graphical representations of states and transitions between the states.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

FIG. 1A and FIG. 1B illustrate a syntax or language for designing, analyzing and describing an HMI, in accordance with embodiments of the present invention.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A state-charts modeling language was proposed by Harel in 1987. Embodiments of the present invention go beyond this, and may capture and model human-machine (HM) interactions that are common to modern day human-machine interaction. According to embodiments of the present invention, syntax and semantics are described for formally describing features, such as, for example, transition from one screen page to another, transitions to a screen page which is currently at level 1 (e.g., home screen) as well as level 2, 3, and so forth, visual presentation of automatic transitions, including system time outs, conditional transitions, data and graphical user interface (GUI) updates, data history, adaptation features, adaptive transitions, distinguishing between system states and system views and displays (including groups of views, displays, and menus), treatment of defaults, reset of display information, dynamics of states, transitions, and display elements, use of overlapping states to capture unique interactions, use of the language and its formal representation to improve design by having a designer go through the process of understanding the structure of the interaction and identifying situations where the design can be simplified, made more consistent, and modular (via reusable patterns), use of both screen views and behavioral views (by means of layers etc.) to view the relation between interaction (behavior) and the actual displays (screens), and switch between such views. When discussed herein, a GUI may be part of an HMI, or may be the equivalent of an HMI.

According to embodiments of the present invention creation of "good" and "bad" interaction patterns modeled may be achieved using the proposed language. A process for model-based usability evaluation using the language may also be facilitated. Embodiments of the present invention offer a modeling-based process to analyze and conduct formal design reviews as well as a method for generation of designs.

Embodiments of the present invention provide a process, system and language for modeling interactions between humans and machines. The modeling may capture or describe interaction between people and tangible devices, such as radios, mechanical devices, factory operation controllers, vehicle control systems, telecommunication control systems, etc. Thus the data manipulated, displayed to a user, or input from a user in some embodiments corresponds to tangible and concrete objects, the machines which interact with people. A design or state chart may be created corresponding to the operation of a machine.

Figure 1B:
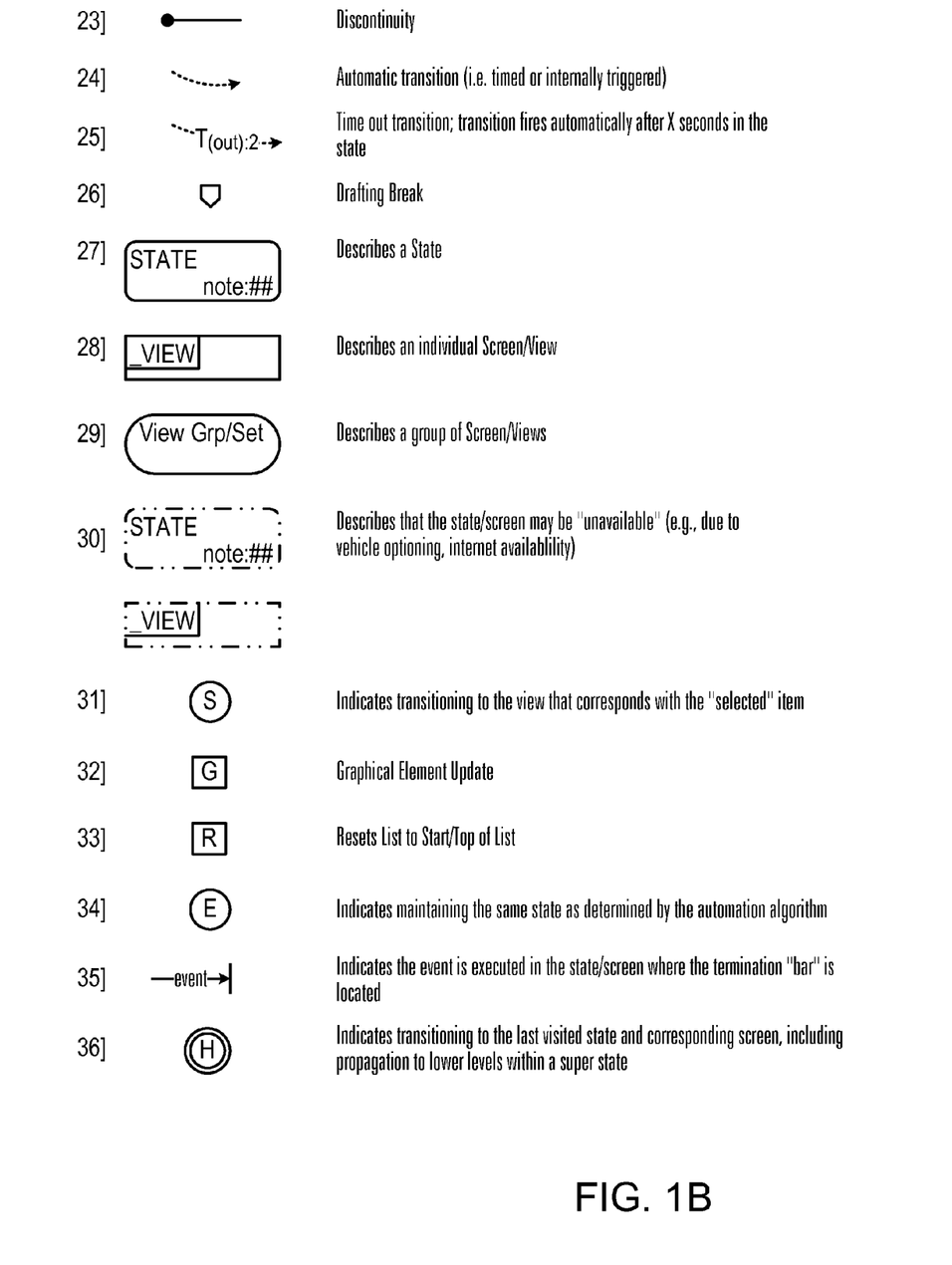

FIG. 1A and FIG. 1B illustrate a syntax or language for designing, analyzing and describing an HMI, in accordance with embodiments of the present invention.

Such syntax or language may include various graphical representations of states, transitions and events triggering these transitions, such as, for example:

control name (1) indicates a faceplate control ("control name" generally denotes the actual name of the control) pressed (event is triggered on "press");

control name_SK (2) indicates a softkey button pressed (event is triggered on "press");

control name_TS (3) indicates a touch screen button pressed (event is triggered on "press");

control name (*) (4) indicates event is triggered when control is "released";

control name (*<t) (5) indicates event is triggered when control is pressed and released within time period t (t may be specified in seconds);

control name (>t) (6) indicates event is triggered when control is pressed and held longer than time period t (t may be specified in seconds);

control name (C) (7) indicates a rotary-type control is rotated clockwise.

control name (CC) (8) indicates a rotary-type control is rotated counter-clockwise;

.or. (9) indicates a transition triggered by one of several events (e.g. when home.or.power are pressed);

.and. (11) indicates a transition triggered when two or more events must be true (e.g. when "home" and "power" are pressed concurrently;

an arrow pointing one way with an event name on it (12) indicates a transition between states or screens;

an arrow split into two or more splits, with an event name on its base and conditions on either of its splits (13) indicates a conditional transition between states or screens (e.g. if larger than 1 go to state A, else go to state B).

Some graphical representations include characteristics of the transitions to which they correspond. For example, encircled "C" (14) indicates transition whose resultant state or screen is conditional, an alternative way of indicating a conditional transition between states or screens;

encircled "P" (15) indicates transition to a previous screen from which the user had come from;

encircled "Ph" (16) indicates transition to a previous screen starting at the top of its hierarchy (e.g. starting at the beginning of an alphabetical list);

encircled "SAME" (17) indicates continuing displaying the same screen prior to the event;

encircled "H" (18) indicates transition to the last visited state and corresponding screen (i.e. History);

encircled home symbol (19) indicates transition back to the Home screen;

an arrow with a dot at a first end and an arrow head at the other head (20) indicates continuity;

a line with a dot at a first end and ending without an addition at the other end (21) (e.g. missing an arrow head or other unique end) indicates discontinuity;

a dashed arrow (22) indicates automatic transition (e.g. timed or internally triggered transition);

a dashed arrow with time out indication (23) indicates automatic transition after the time indicated has passed;

a tab (24) indicates a drafting break;

a rectangle with rounded corners (25) indicates a specific state (a state name may be indicated within the rectangle);

a rectangle with sharp (e.g., angled) corners (26) depicts a screen or view (the screen or view name may be indicated within the rectangle);

a rectangle with rounded corners (27) that has an aspect ratio that is different that the aspect ratio of rectangle (25) indicates a group of screens or views;

a dashed rectangle with rounded corners (28) indicates a state or screen that is unavailable (e.g. due to internet unavailability), whereas a dashed rectangle with sharp corners describes an unavailable screen or view;

an encircled "S" (29) indicates a transition to a view that corresponds to a "selected" item;

a squared "G" (30) indicates a graphical element update;

a squared "R" (31) indicates a reset of a list to top or start of the list;

an encircled "E" (32) indicates maintaining the same state (e.g. as determined by an automated algorithm);

an arrow with an event name in which the arrow head points at a perpendicular line (33) indicates an event that is executed in the screen or state where a termination bar is located;

an encircled "H*" (34) indicates transition to the last visited state and corresponding screen, including propagation to lower levels within a super state.

Other specific languages or syntaxes or syntax elements may be used, corresponding to different types of machine interfaces. Event indications corresponding to events that trigger the transitions may be included, e.g., control name (1). The syntax or language described in FIG. 1 is an example of a syntax or language which may represent, e.g., to a designer of a GUI or HMI, a flow and transition among states of a machine or HMI representing the machine and among displayed screens or other outputs by an HMI. The transitions may be triggered by, e.g., human input (e.g., "control name_SK (2)") or by other events. A designer may create a state chart or design using such a syntax, simulate the operation of a real-world HMI (and thus of a real-world machine) using the state chart or design, and then design and thus create a real-world machine which functions in part according to the state chart or design.

Figure 2:
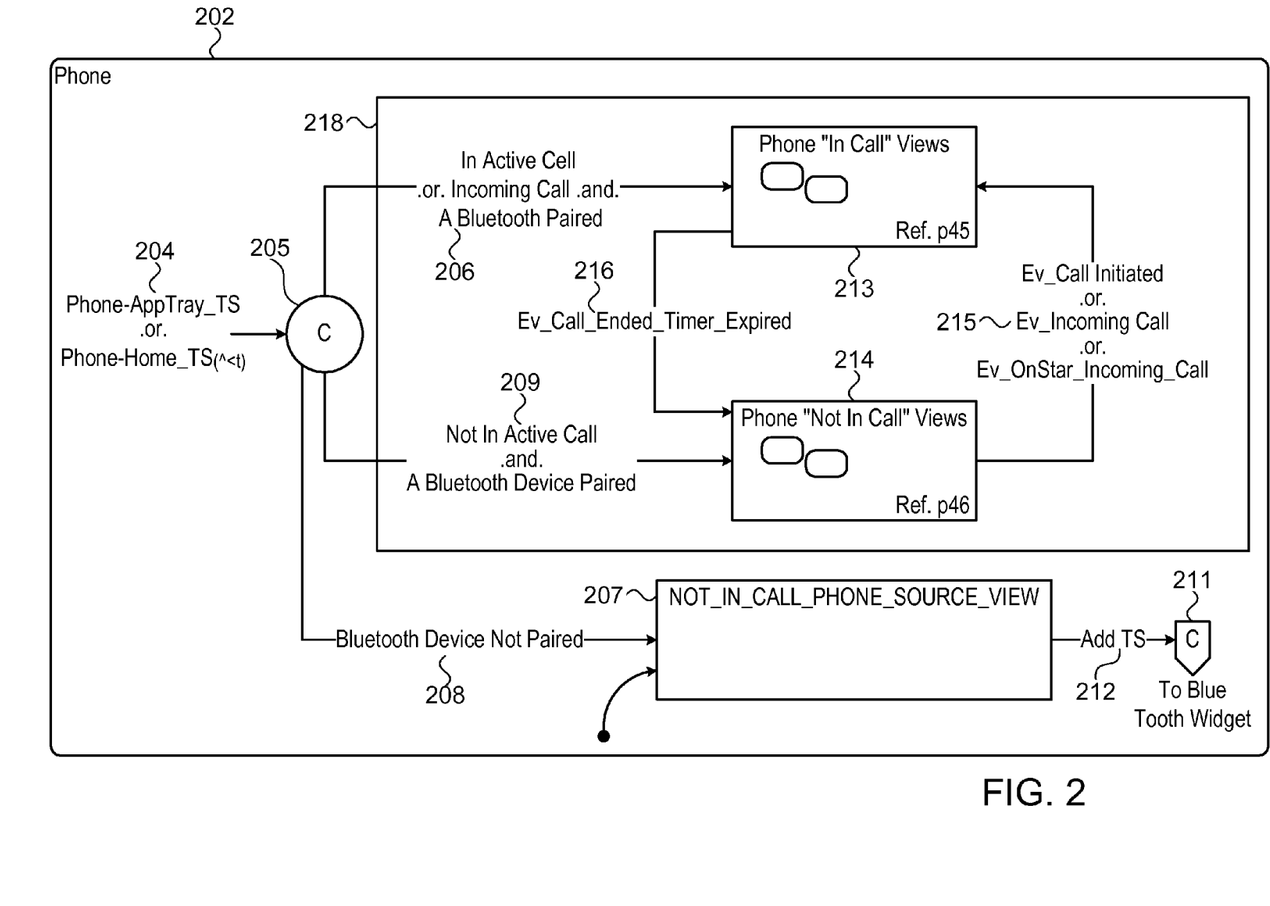
FIG. 2 illustrates an example of an HMI design, in accordance with embodiments of the present invention.

FIG. 2 illustrates an example of an HMI specification, scenario, design, flow chart or state chart, in accordance with embodiments of the present invention. In this example, the HMI is of a telephone HMI. The various states and transitions shown in FIG. 2 and the other state charts or designs shown herein correspond to the functionality of machines such as telephones, radios, audio systems, etc. Shown is a group of states denoted "phone" (202) which describes an event of a telephone application touch screen or telephone home touch screen button (204) being pressed. A conditional transition (205) from that event leads to three optional states.

In the event "Bluetooth device not paired" (208) a "not in call telephone source" screen 207 (e.g., an object in a state chart or HMI design) is shown, and upon pressing an "Add" touch screen button (212) a drafting break (211) is reached. Objects shown in a state chart or design may include, for example, states, screens, or other entities.

A group of views 218 may include telephone "in call" views (213) and telephone "not in call" views (214).

In the event "In active call" or "Incoming call", and "Bluetooth device paired" (210) telephone "in call" views (213) are displayed, the display of which may change to telephone "not in call" views (214) in the event "call ended timer expired" (216). telephone "not in call" views (214) may switch to telephone "in call" views (213) in the event "call initiated or incoming call or OnStar incoming call" (215, note the OnStar system is a specific feature in HMIs in some General Motors automobiles).

In some embodiments, rectangles with large round corners may represent main states. Rectangles with sharp or angled corners may represent actual displays or drafts of actual displays. E.g. a "now playing" screen is a name for a specific screen with many details not shown that a manufacturer may knows of. Transitions between states may be represented by for example lines. Lines with arrows may correspond to transitions triggered by pressing of buttons, user input, or other system events. Larger rectangles that include smaller boxes may represent clusters or superstates. Rectangles with no defined border, e.g. home .or. phone, may correspond to events causing transitions. A transition from a "view" (a display rectangle with sharp corners) to a state (a rectangle with round corners) may also indicate transitions to another screen where the screen is defined by the state.

Figure 3:
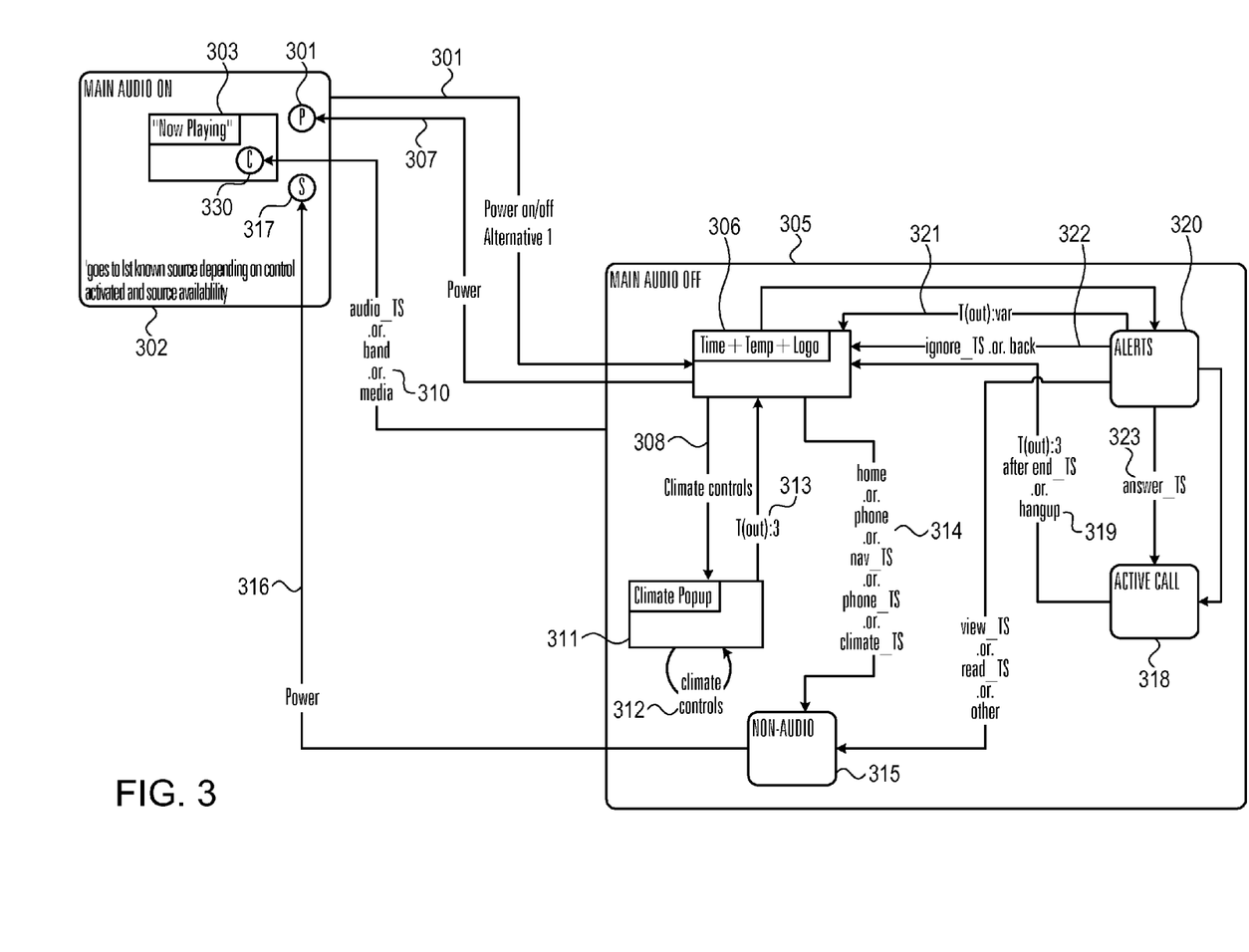
FIG. 3 illustrates an example of a process for reviewing and comparing different HMI designs, in accordance with embodiments of the present invention.

FIG. 3 illustrates a first alternative for an audio HMI design (e.g., for a radio, car stereo or audio system). "Main audio on" state (302) includes screen "Now Playing" (303).

Triggering event "Power" (304) leads to state "Main Audio Off" (305) in which screen "Time, Temp, Logo" (306) is displayed. When triggering "power" (307) again screen "now playing" (303) is displayed and state "Main Audio On" (302) is re-established, returning to a previous screen (301).

State "Main Audio On" (302) may be also re-established when the event "audio touch-screen or band or media" (310) is triggered, in a transition whose resultant screen is conditional, to a lower level within a super state (330).

In state "Main Audio Off" (305), when triggering "climate control" (308), "climate popup" screen (311) is displayed. Retriggering "climate control" (312) maintains "climate popup" screen (311) displayed. However, after a time out period of 3 seconds has lapsed (313), "Time, Temp, Logo" screen (306) is redisplayed.

During the display of "Time, Temp, Logo" screen (306), when "home or telephone or nav(igation) touch screen or telephone touch screen or climate touch screen" is triggered (314) "non-audio" state (315) is established.

When in state "non-audio", upon triggering "power" (316), state "main audio on" (302) is regained in a transition to the view that corresponds with the selected item (317).

When in "active call" state (318), after a time out period of 3 seconds has lapsed following the triggering of "end touch screen or hang-up" event (319), "Time, Temp, Logo" screen (306) is displayed.

When "alerts" screen (320) is displayed, after time out period of predetermined value (var) (321) has lapsed, or when event "ignore touch screen or back" (322) is triggered, "Time, Temp, Logo" screen (306) is redisplayed. If "answers" event (323) is triggered, "active call" state (318) is established.

Figure 4A:
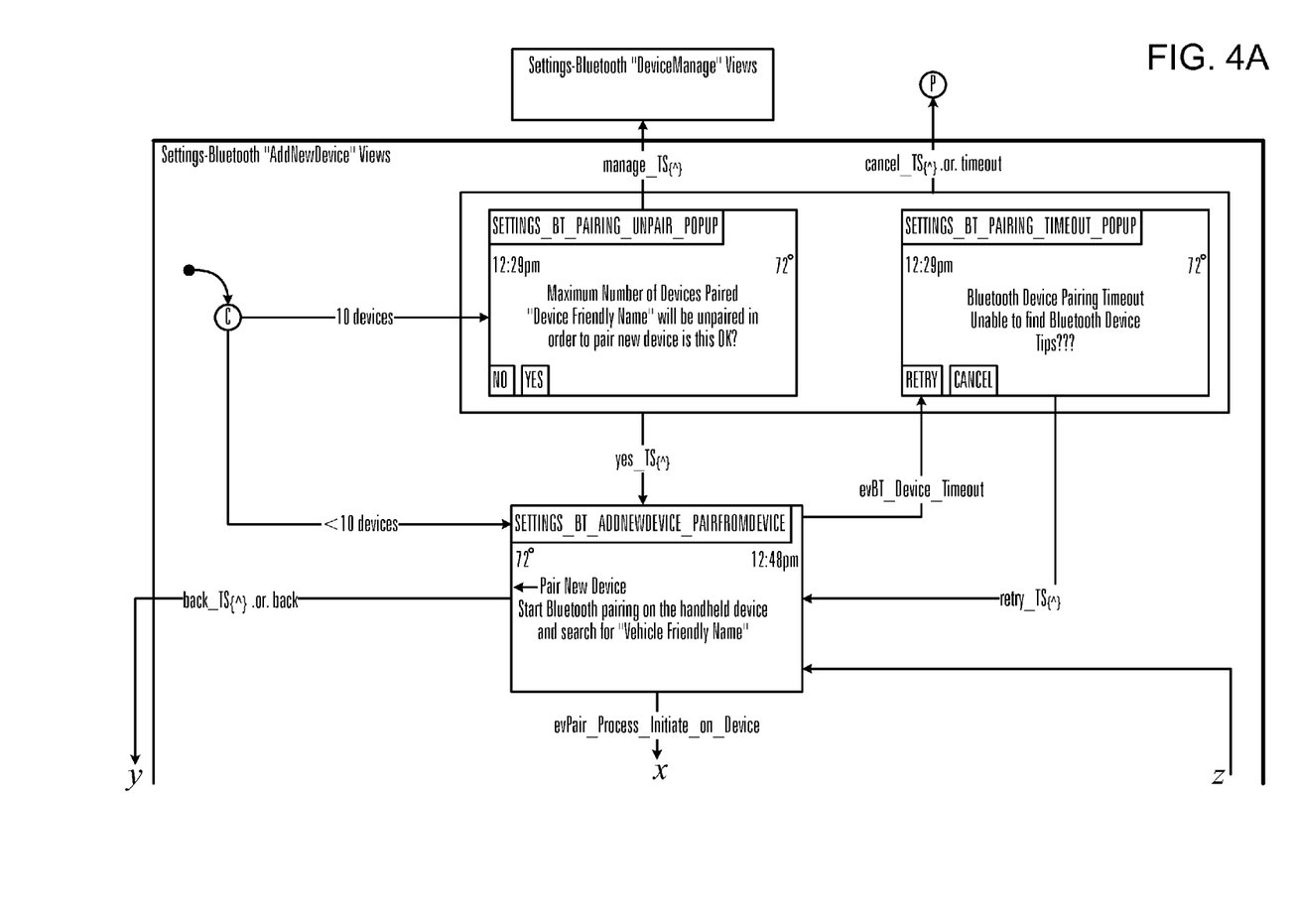
FIGS. 4A-C illustrate a structured HMI specification in accordance with embodiments of the present invention, relating to a Bluetooth HMI. The indications "x", "y" and "z" are used to indicate related connections extending between FIG. 4A and FIG. 4B, whereas "n", "p", "q", "r", "w" and "z" are used to indicate related connections extending between FIG. 4B and FIG. 4C.
Figure 4B:
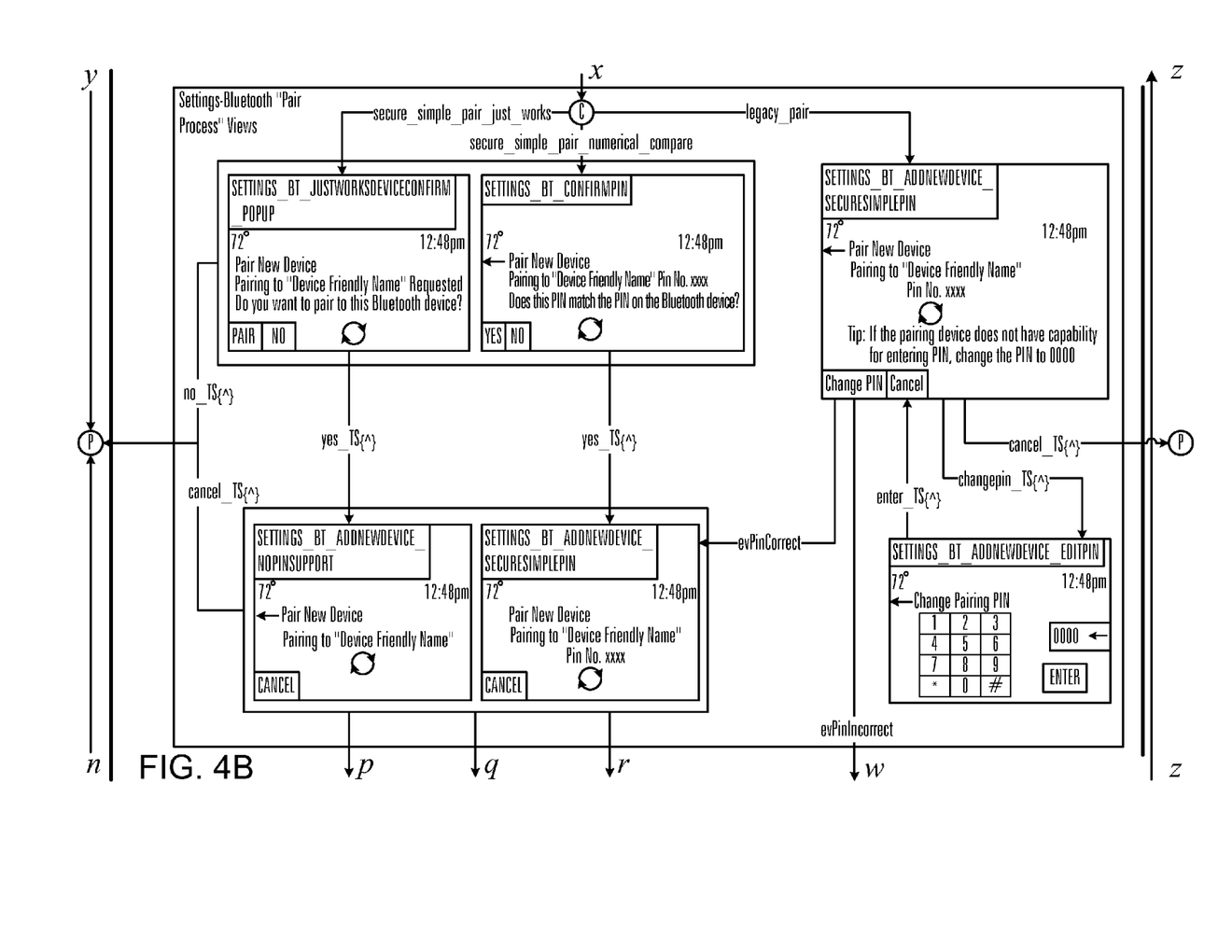
Figure 4C:
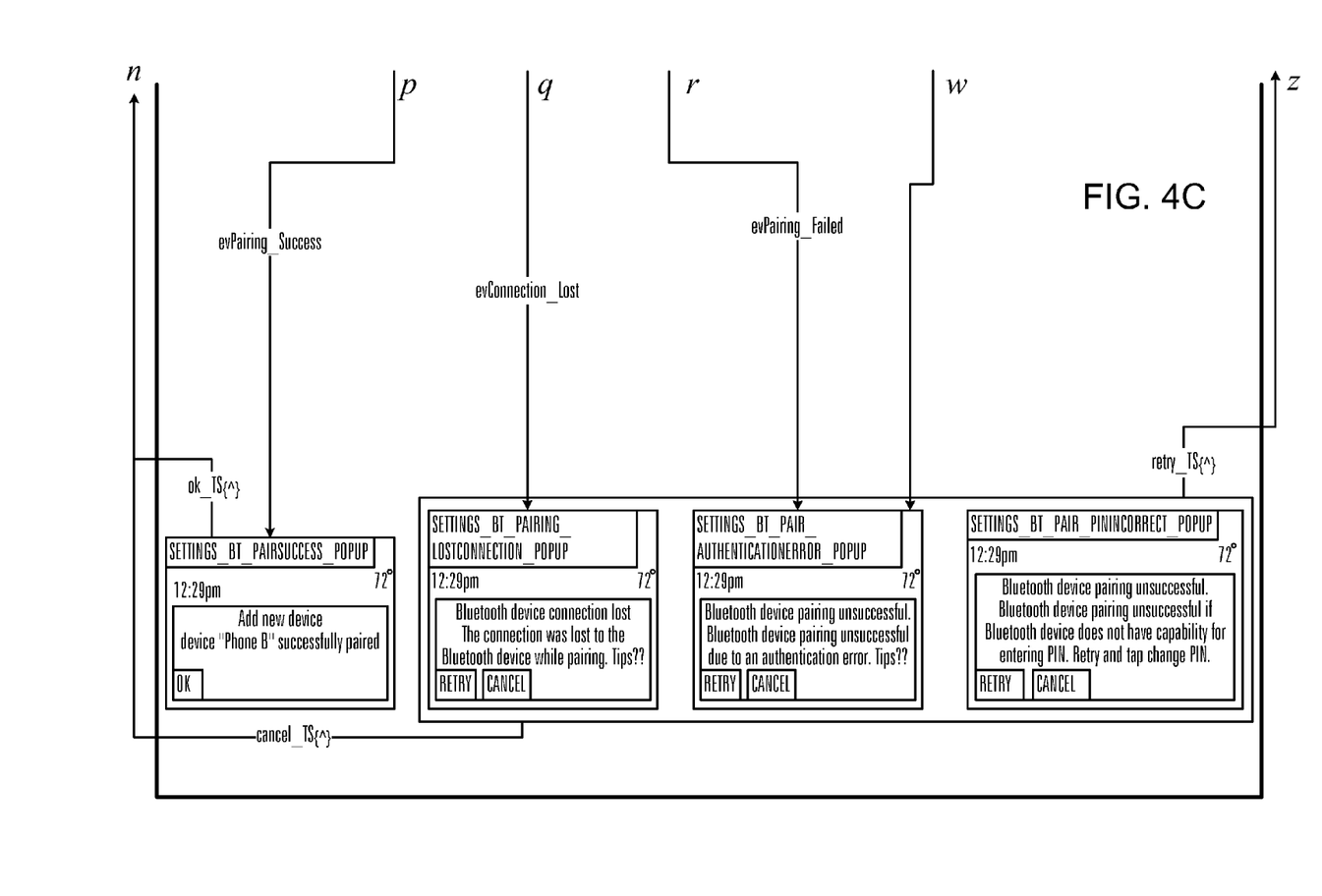

FIGS. 4A-C illustrate a structured HMI specification in accordance with embodiments of the present invention, relating to a Bluetooth HMI. The indications "x", "y" and "z" are used to indicate related connections extending between FIG. 4A and FIG. 4B, whereas "n", "p", "q", "r", "w" and "z" are used to indicate related connections extending between FIG. 4B and FIG. 4C.

Figure 5A:
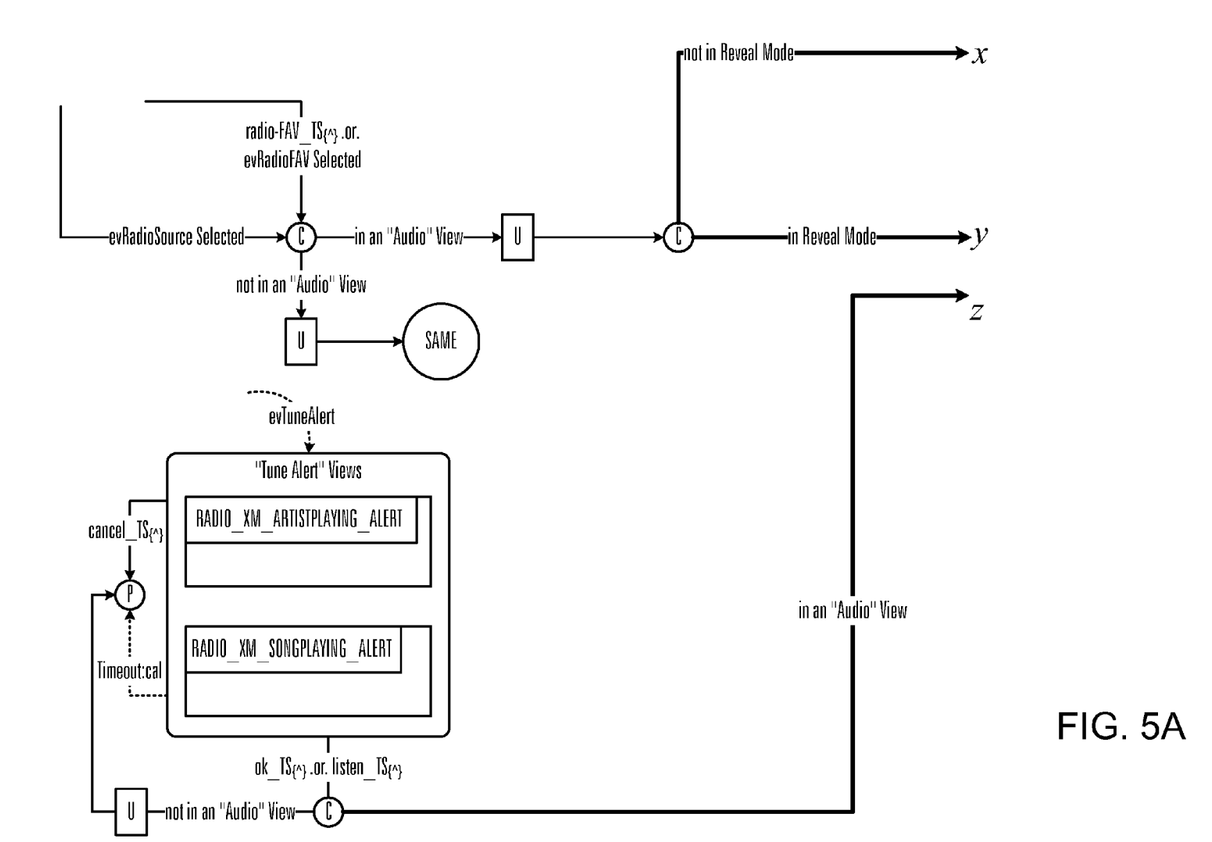
FIGS. 5A-B illustrate a structured HMI specification in accordance with embodiments of the present invention, relating to an audio HMI. The indications "x", "y" and "z" are used to indicate related connections extending between FIG. 5A and FIG. 5B.
Figure 5B:
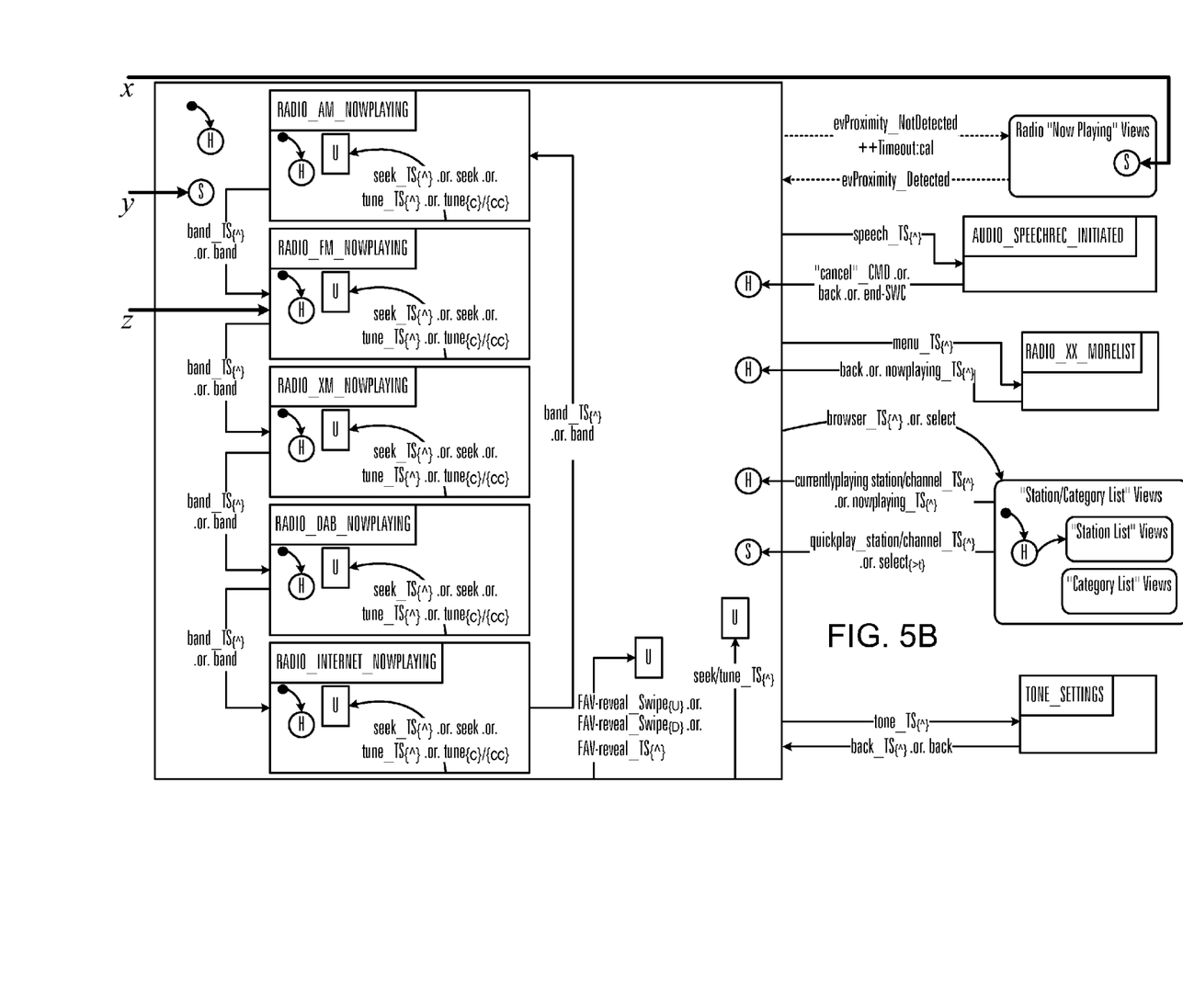
Figure 6A:
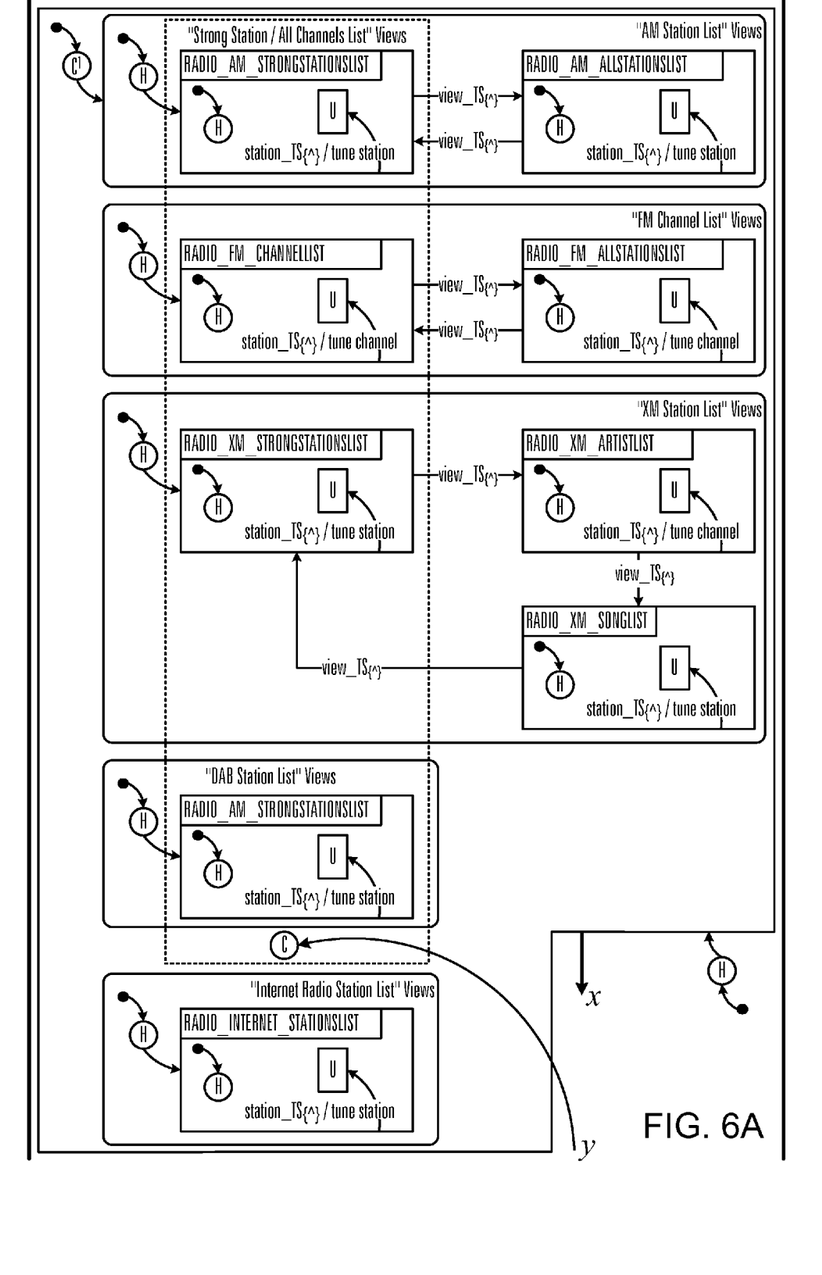
FIG. 6 illustrates a structured HMI specification in accordance with embodiments of the present invention, relating to a radio HMI. The indications "x" and "y" are used to indicate related connections extending between FIG. 6A and FIG. 6B
Figure 6B:
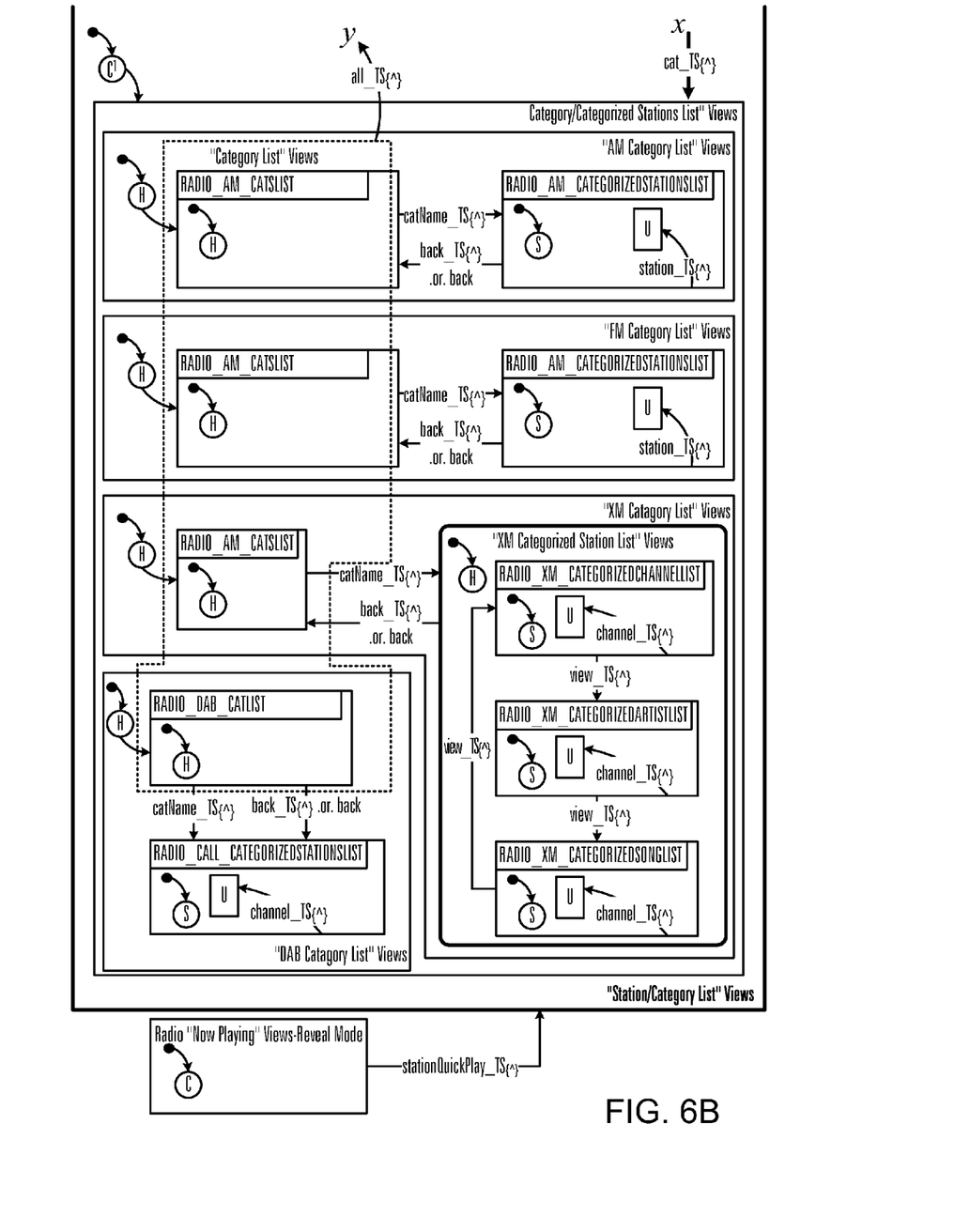

FIGS. 5A-B illustrate a structured HMI specification in accordance with embodiments of the present invention, relating to an audio HMI. The indications "x", "y" and "z" are used to indicate related connections extending between FIG. 5A and FIG. 5B FIG. 6 illustrates a structured HMI specification in accordance with embodiments of the present invention, relating to a radio HMI.

Figure 7A:
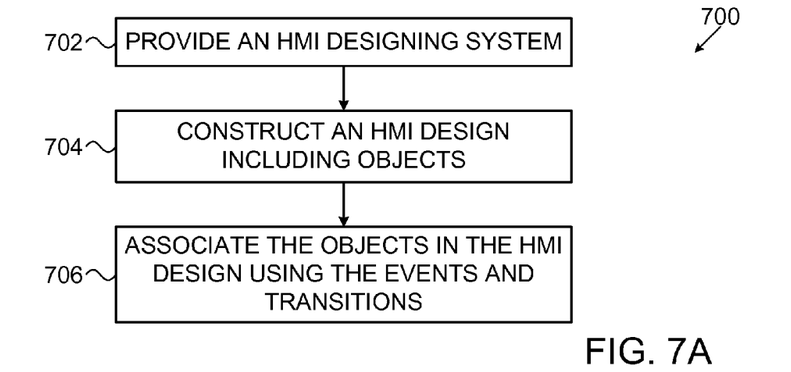
FIG. 7A illustrates a method for analyzing and specifying an HMI, in accordance with embodiments of the present invention.

FIG. 7A illustrates a method (700) for designing, analyzing and/or specifying an HMI, in accordance with embodiments of the present invention.

Figure 8:
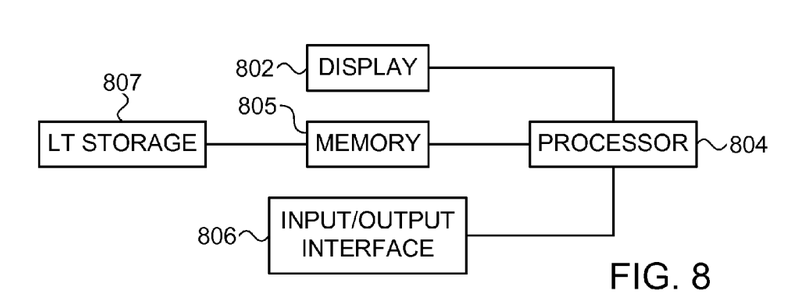
FIG. 8 illustrates a system for designing, analyzing and/or specifying an HMI, in accordance with embodiments of the present invention.

An embodiment of the method may be performed using a system such as shown in FIG. 8 which may allow a user to manipulate or edit a design such as shown in FIG. 2 or any of the other figures. The system depicted in FIG. 8 may be configured to simulate the operation of the HMI and thus simulate the machine based on a design or state chart. Systems other than that depicted in FIG. 8 may be used.

The method (700) may include providing (702) an HMI designing system (e.g. for designing an HMI), such as, for example shown in FIG. 8. The method may also include constructing (704) an HMI design (e.g., a flow chart, state chart, or design) which is made up of state or screen objects (e.g., objects 209, 214, 320, etc.) and associating (706) the objects in the HMI design using associations that include for example events and transitions. A user may add these associations using (e.g., by providing an input to) a computer.

Figure 7B:
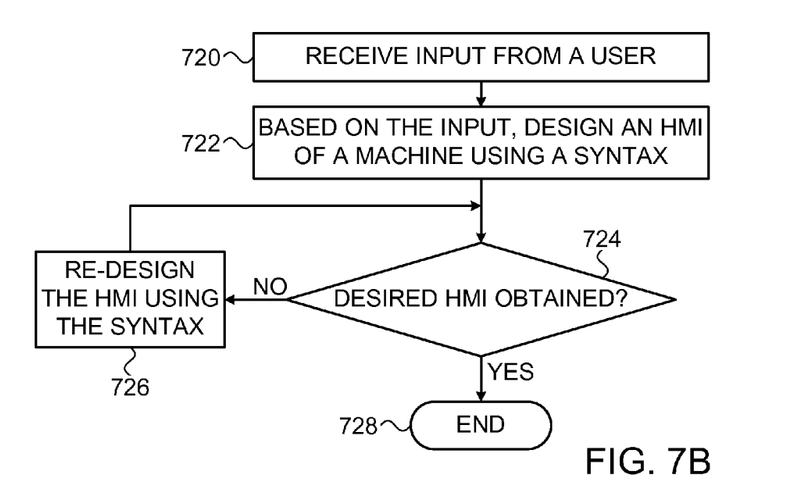
FIG. 7B illustrates a method for designing and analyzing an HMI, in accordance with embodiments of the present invention.

FIG. 7B illustrates a method for designing and analyzing an HMI, in accordance with embodiments of the present invention. An embodiment of the method may be performed using an HMI designing system (such as for example the system shown in FIG. 8, although other systems may be used) and may include receiving (720) input (e.g. states, displays, events, transitions). The method may further include, based on the input, designing (722) an HMI of or representing a machine using a syntax that includes graphical representations of states of the machine, and transitions between the states to describe a human-machine interface operated by a machine.

The syntax may also include graphical representations of states, transitions between the states and events triggering the transitions. Such events may include, for example, pressing of one or more buttons, touching a touch sensitive area on a touch screen, receiving an electronic signal from an outside source, etc.

The method may further include determining (724) whether a desired HMI has been obtained. The determination may be carried out manually by a user or automatically by a machine. If a desired HMI has not been obtained, then the HMI design may be re-designed (726) manually by a user or automatically by a machine, using the syntax. Once the desired HMI design has been obtained the process may end (728).

FIG. 8 illustrates a system (800) for designing, analyzing, simulating and/or specifying an HMI, in accordance with embodiments of the present invention.

The system (800) may include a memory or storage device (805) for storing a computer executable program for executing a method according to embodiments of the present invention, and data related to an HMI or a design or state chart representing a machine's operation (e.g., a representation of an HMI). Long term storage (807) may also store data. A processor (804) may be included for executing the stored program. An input/output interface (I/O) (806), such as for example, an I/O device selected form the group of I/O devices that includes keyboards, pointing devices, touch-screens, electronic pens, and the like, may be provided, to allow a user to interact with the program.

A display device (802) may be provided to allow a user to view the HMI design during designing, analyzing and specifying stages.

Processor or controller 804 may be, for example, a central processing unit (CPU), a chip or any suitable computing or computational device. Processor or controller 804 may include multiple processors, and may include general purpose processors and/or dedicated processors such as graphics processing chips. Processor 804 may execute code or instructions, for example stored in memory 805 or long term storage 807, to carry out embodiments of the present invention.

Memory 805 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 805 may be or may include multiple memory units.

Long term (LT) storage 807 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Memory 805 and/or long term storage 807 and/or other storage devices may store a representation of the human-machine interface. Processor 804 may be configured to receive input from a user, and based on the input, and using a syntax that includes graphical representations of states of the machine, and transitions between the states, describe a human-machine interface operated by a machine.

Memory 805 and/or long term storage 807 and/or other storage devices may store data constructs, intermediate data, etc of the HMI design and program or programs including instructions that when executed cause the system to become an HMI designing system applying a method for designing, analyzing or specifying an HMI, in accordance with embodiments of the present invention, such as for example, the methods described hereinabove.

Aspects of the present invention may be embodied as a computer program product such as a non-transitory computer-readable medium, having stored thereon computer-readable program code or instructions. For example, the computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code of the above described embodiments of the invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for analyzing and specifying a Human-Machine Interface (HMI), the method comprising:
   providing an HMI designing system;
   constructing an HMI design comprising objects of a vehicle control system using the HMI designing system; and
   associating the objects of the vehicle control system in the HMI design using associations including events and transitions using the HMI designing system.

2. The method of claim 1, wherein constructing the HMI design using the HMI designing system includes receiving input from a user.

3. The method of claim 2, comprising using a syntax comprising graphical representations of states of a machine and transitions between the states.

4. The method of claim 3, wherein the transitions comprise conditional transitions.

5. The method of claim 1, wherein the objects comprise states and screens.

6. The method of claim 1, wherein the graphical indications of the transitions comprise arrows.

7. The method of claim 1, wherein event names are assigned to the graphical representations of the transitions corresponding to events that trigger those transitions.

8. A method for designing and analyzing a human-machine interface, the human-machine interface corresponding to the operation of a vehicle control system, the method comprising:
   receiving input from a user; and based on the input, using a syntax that includes graphical representations of states of the vehicle control system and transitions between the states to describe a human-machine interface of the vehicle control system.

9. The method of claim 8, wherein the syntax comprises screen views.

10. The method of claim 9, wherein the syntax comprises graphical representations of events that trigger the transitions.

11. The method of claim 8, wherein the syntax comprises graphical indications relating to characteristics of the transitions.

12. The method of claim 8, wherein the transitions include conditional transitions.

13. The method of claim 8, wherein the transitions are indicated by arrows.

14. A system for designing and analyzing a human-machine interface, the human-machine interface corresponding to the operation of a vehicle control system, the system comprising:
   a memory storing a representation of the human-machine interface; and a processor configured to receive input from a user, and based on the instructions, and using a syntax that includes graphical representations of states of the vehicle control system, and transitions between the states, describe a human-machine interface of the vehicle control system.

15. The system of claim 14, further comprising a display device for displaying graphically the human-machine interface.

16. The system of claim 14, wherein the syntax further comprises screen views.

17. The system of claim 14, wherein the syntax further comprises graphical indications relating to characteristics of the transitions.

* * * * *